Feb. 15, 1966 W. HAUPT ET AL 3,235,177

TAXIMETER WITH REMOTE CONTROL

Filed Dec. 16, 1960 4 Sheets-Sheet 1

INVENTORS
Wilhelm Haupt
Heinz Kelch
BY Michael S. Striker
Attorney

FIG. 4

INVENTORS
Wilhelm Haupt
Heinz Kelch
BY Michael S. Striker
Attorney

FIG.6

United States Patent Office 3,235,177
Patented Feb. 15, 1966

3,235,177
TAXIMETER WITH REMOTE CONTROL
Wilhelm Haupt and Heinz Kelch, Villingen, Black Forest, Germany, assignors to Kienzle Apparate G.m.b.H., Villingen, Black Forest, Germany
Filed Dec. 16, 1960, Ser. No. 76,253
Claims priority, application Great Britain, Dec. 16, 1959, 42,774/59
16 Claims. (Cl. 235—30)

The present invention relates to a taximeter with remote control, and more particularly to a taximeter arrangement in which a first unit with a taximeter mechanism and fare indicating means is mounted on a car in a position suitable for inspection, while a second control unit is accessible to the driver for controlling the operations of the taximeter from his seat.

In some cities, police regulations require taximeters to be mounted where the police and the passenger can easily inspect the indications, and at a part of the taxicab so far from the driver's seat that the driver cannot set certain operations on the taximeter without leaving his seat.

In some cities taxicabs are provided with a baggage compartment in the free space adjacent the driver's seat, and police regulations require that the taximeter is mounted outside of the car adjacent the baggage compartment so that the taximeter may be inspected by the police as well as by the passengers of the taxicab.

In other countries and cities, police regulations also require that a taximeter be mounted in front of the wind screen outside of the car. In this manner, police can control the taxicab drivers, and particularly enforce the rule that the taximeter must be in operation whenever a passenger rides the taxicab.

As a result of these police regulations, the taxicab drivers found it very inconvenient to operate the taximeter mechanism to set the same to different fare tariffs, and to start and stop the taximeter mechanism, since each operation of this kind requires the driver to leave his seat, to walk around the car, and to set the taximeter.

It is one object of the present invention to overcome these disadvantages of known taximeter arrangements of this type and to provide a taximeter arrangement in which the driver of the car is capable of influencing the taximeter mechanism from his seat, regardless of the position of the taximeter.

Another object of the present invention is to provide a taximeter which is mounted on a car in a position suitable for inspection by passengers and by the police, and to mount a control unit for the taximeter mechanism in the region of the driver's seat so that the driver of the taxicab can set the taximeter without leaving his seat.

A further object of the present invention is to provide a taximeter unit, and a control unit remote from the taximeter unit and electrically connected to the taximeter unit for setting the same to different operations.

With these objects in view, a taximeter arrangement of the present invention comprises a first unit including fare indicating means, drive means for the same, and actuating means for setting the drive means to perform different operations; and a second unit including manually operated control means operatively connected to the actuating means and being disposed remote from the first unit. Thus, when the first unit is mounted on the car at a location suitable for inspection by the police and by the passengers, for example outside of the car, the second unit can be placed adjacent the driver's seat and be operated by the driver.

In the preferred embodiment of the present invention, the actuating means are electro-mechanical and include switching means which are electrically connected to control switches in the second unit which also contains control push buttons associated with various operating conditions of the taximeter.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
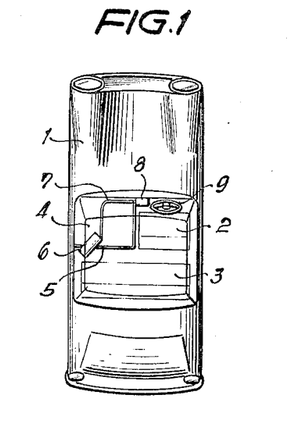
FIG. 1 is a schematic plan view showing a car in which the taximeter is located in the interior of the car.

Referring now to the drawings, and more particularly to FIG. 1, a taxicab 1 has the driver's seat 2 on the right side, as required in countries where traffic moves on the left side of the road. In the rear of the driver's seat, two seats 3 are provided for the passengers, and adjacent the driver's seat there is a baggage compartment 4 separated by a wall 5 from the driver's seat and from the passengers' compartment 3. The baggage compartment is open on the left so that bags and suitcases can be placed in the baggage compartment 4 from the outside of the car by a person standing on the left side of the same. The taximeter unit 6 is mounted on a bracket in the baggage compartment 4 and is connected by the cable 7 to a control unit 8 mounted on the dashboard in the region of the driver's seat.

Figure 2:
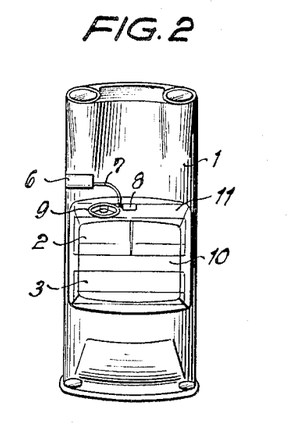
FIG. 2 is a schematic plan view illustrating a car in which the taximeter is located on the outside of the car.

FIG. 2 shows a taxicab in which the passenger compartment 10 includes, in addition to the driver's seat, three seats for the passengers. The taximeter unit 6 is mounted on the left fender forwardly of the windshield 11, and is connected by an electric cable 7 to the control unit 8 which is mounted on the dashboard inside the car in the region of the driver's seat which is arranged on the left side of the car as is required where traffic moves on the right side of the road.

Figures 3, 5:
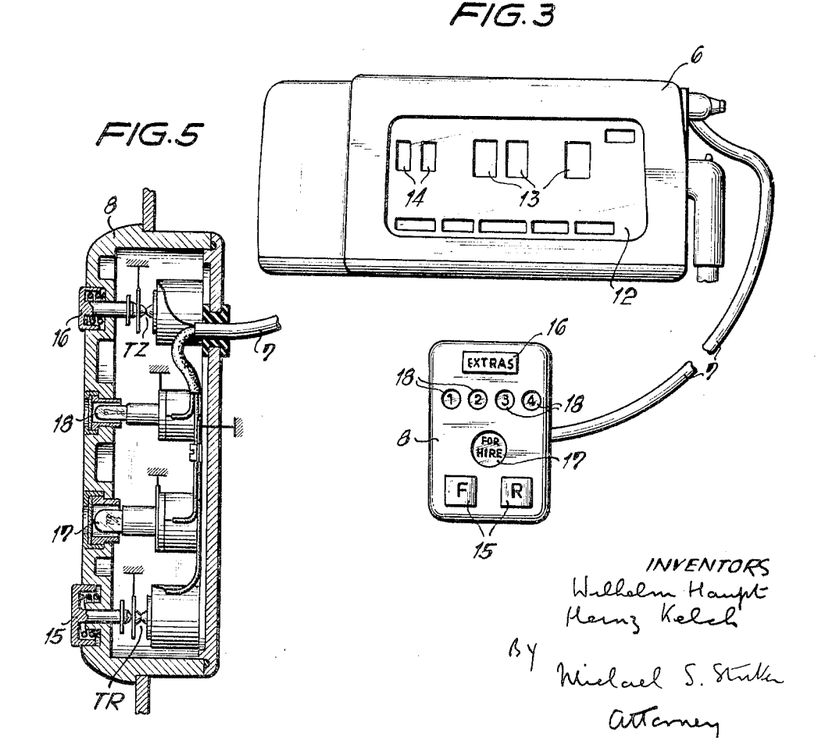
FIG. 3 is a schematic elevation illustrating the taximeter unit and the control unit according to one embodiment of the invention.
FIG. 5 is a vertical section illustrating the control unit according to one embodiment of the invention.

FIG. 3 illustrates the taximeter unit 6 and the control unit 8 which are connected to each other by the electric cable 7. The taximeter unit 6 has a transparent window 12 behind which the number wheels 13 of the fare indicating means are arranged. Number wheels 14 are also provided behind the window 12 for indicating additional charges such as may be required for carrying baggage, and such additional charges will be hereinafter referred to as "extras." The control unit 8 has two push-buttons 15 respectively marked F and R for effecting certain switching operations in a forward or reverse order. A push button 16 marked "extras" will start the operation of the counter mechanism for additional charges. An indicating lamp 17 will illuminate a sign "For Hire," and a set of four indicating lamps 18 are provided for indicating different fare tariffs, each of which will result in a different fare for the same operations of the taxicab.

Figure 4:
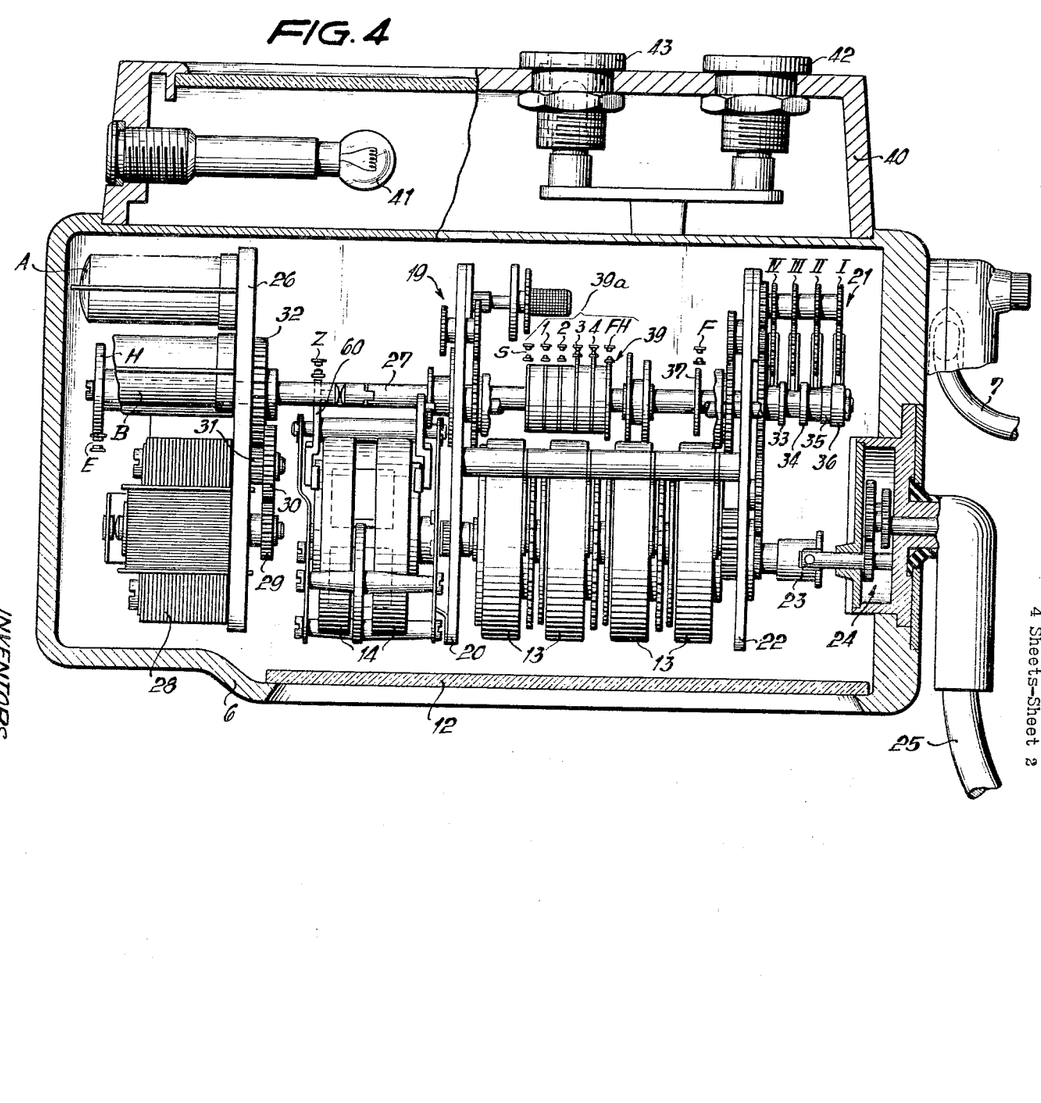
FIG. 4 is a horizontal sectional view illustrating the taximeter unit according to one embodiment of the invention.

The mechanical construction of the taximeter unit 6 is best seen in FIG. 4. The unit has a front casing part with the window 12, and the rear casing 40 in which signal lamps are located. The fare indicating means 13 are driven by a conventional time drive means 19, which is only partially shown arranged on both sides of a support plate 20 and an odometer or distance drive means 21 which is disposed on both sides of another support plate 22 and is driven through a coupling means 23 and an adapter gearing 24 from a flexible shaft 25 connected to the wheels of the car.

An actuating shaft 27 is rotatably mounted on support plates 20, 22 and 26 and is driven by a motor 28 through a reduction gearing including gears 29, 30, 31 and 32. Actuating shaft 27 carries a number of fixed control cams for controlling the various operations of the taximeter. Cams 33, 34, 35 and 36 are associated with the distance drive means 21 and effect the coupling of the counter mechanism or fare indicating means 13 to the shaft 25 through different gear stages I, II, III and IV which are correlated to different fare tariffs.

Control cam 37 controls a reversing switch F which, corresponding to the position of cam 37, will effect rotation of motor 28 and shaft 27 in forward or reverse direction, respectively. The reversal of the direction of rotation of shaft 27 is only possible in certain positions of this shaft. Therefore, control cam 37 is of such shape that in positions in which a reversal of the motor is permissible, switch means F are closed, whereas in positions of shaft 27 in which a reversing of its rotation is not permissible, control cam 37 will leave the switch means F open. Actuating shaft 27 carries a cam unit 39 composed of a set of six control cams respectively cooperating with six switches 39a including switches S, 1, 2, 3, 4, and FH. Switches 39a1 to 39a4 and switch 39aFH control the supply of current to various signal lamps in the rear casing 40 and in the control unit 8.

Another control cam 60 controls a switch means Z which controls the supply of current to the drive means for the indicator 14 by which additional charges are indicated. At one end of shaft 27, another control cam H operates a switch means E including three pairs of contacts, as best seen in the diagram of FIG. 7.

Figure 7:
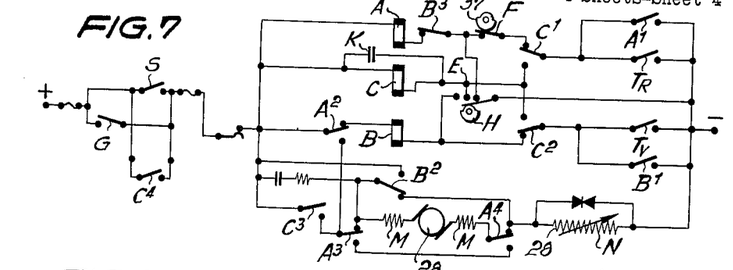
FIG. 7 is a diagram illustrating the electric connection of a detail of the circuit shown in FIG. 6.

Support plate 26 carries three relays A, B and C shown in FIG. 7, but only relays A and B are visible in FIG. 4.

Figure 6:
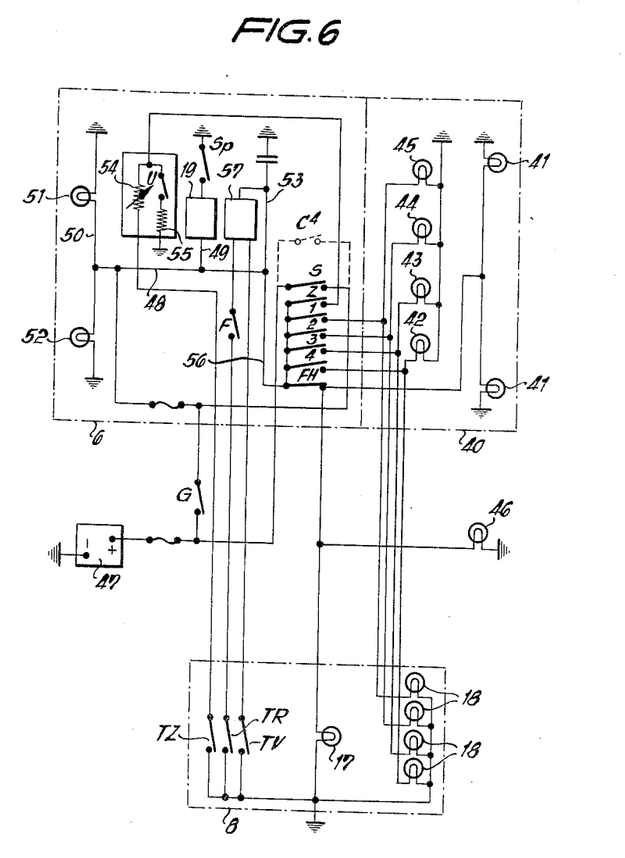
FIG. 6 is a diagram illustrating the electric circuit of one embodiment of the invention.

Rear casing 40 houses two signal lamps 41 for illuminating the sign "For Hire" and four signal lamps 42 to 45 for indicating one of the four fare tariffs at which the taximeter can be operated, only two signal lamps 42 and 43 being visible in FIG. 4, while all signal lamps 42 to 45 are shown in the diagram of FIG. 6.

An electric cable 7 connects the switching means of the taximeter mechanism, and more particularly the motor 28 with the switches of the control unit 8 which is shown in section in FIG. 5. FIG. 6 shows in chain lines the parts 6, 40 and 8 of the arrangement so that it is clearly apparent which mechanical and electrical parts are housed in each of the casings.

As explained with reference to FIG. 3, the control unit has two push buttons 15 marked F and R which are respectively connected to control switches TV and TR for operating the same. The push button 16, which is associated with the additional charges, operates the control switch means TZ. The indicating lamp 17 illuminates the "For Hire" sign in the control unit, and the four signal lamps 18 are respectively switched on when the taximeter is set to operation at one of the four fare tariffs I to IV. A sign on the roof of a taxicab is illuminated by a lamp 46 which is connected in the same circuit as lamp 17 so as to be lighted whenever the sign "For Hire" is lighted.

Referring now particularly to FIG. 6, it will be seen that current is supplied by the battery 47 of the car to the positive terminals of the various devices through two switches G and S which are connected in parallel. Switch G is arranged outside of the units 6 and 8 and in the proximity of the ignition switch so as to be closed when the ignition switch is closed by the ignition key. As mentioned above, switch S is operated by one of the cams 39 on actuating shaft 27. Switch S is opened in the "For Hire" position of actuating shaft 27 within a small angular range, but is closed whenever shaft 27 is in any other position. The entire apparatus is supplied with current either through switch G or through switch S. When the ignition switch is closed, the apparatus will be energized through switch G. When the ignition switch is open, the apparatus will be energized through switch S if shaft 27 is in any other than the "For Hire." Consequently, the driver can switch off the entire apparatus by the use of the ignition key, together with the ignition switch provided that shaft 27 is in the "For Hire" position. This is the desired condition of the taximeter arrangement when the driver leaves his car. However, if the driver opens ignition switch G in a position in which shaft 27 is not in the "For Hire" position, contact S will remain closed, and the apparatus will be energized and will indicate a fare under control of the time drive means which in a well-known manner drives the apparatus to indicate a fare while the taxicab is hired, but at a standstill. As a result of this arrangement, the driver cannot leave his car without indicating that the car is "For Hire" when the taximeter does not operate.

Battery 47 is connected through one of the switches G and S to a main line 48. A branch line 49 supplies the time drive means 19 with current, such time drive means including an electromagnetic drive and a switch Sp which automatically disconnects the time drive means when required by the operational conditions. Another branch line 53 supplies the switching arrangement shown in FIG. 7 with current, and this switching arrangement is indicated by a block 57 in FIG. 6. Switching arrangement 57 is connected through switch F, which is controlled by cam 37, to switches TR and TV in control unit 8. The drive means for the counter wheels 14 by which additional charges are indicated, are controlled by two electromagnets 54 and 55 which are respectively associated with the unit order and with a second order of a number wheel 14. Electromagnets 54 and 55 are connected to the battery 47 through switch Z controlled by cam 60 and switch TZ controlled by pushbutton 16 in the control unit 8. Switch Z will be opened whenever switch S is open so that the electromagnetic means 54, 55 can be operated in all positions of shaft 27, except the "For Hire" position so that electromagnetic means 54, 55 cannot be operated when the car is placed in the garage.

Another branch line 56 of the main line 48 supplies current to the switches 39aZ, 1 to 4, and FH which are operated by the set of control cams 39. These switches are connected to the lamps 41 to 45 of the indicator casing 40, to signal lamp 46 on the roof, and to signal lamps 17 and 18 in the control unit 8.

The details of the circuit of the switching arrangement shown as a block 57 in FIG. 6, will now be explained with reference to FIG. 7. The switches G and S are connected in parallel to the plus terminal as explained above, and fuses are provided to protect the apparatus. The switching arrangement shown in FIG. 7 includes three relays A, B, C. Relay A controls four relay contacts A1, A2, A3, and A4 which mainly control the functions of motor 28, and two contacts A5 and A6 which control the operations of the device for indicating additional charges, as shown in FIG. 8.

Figure 8:
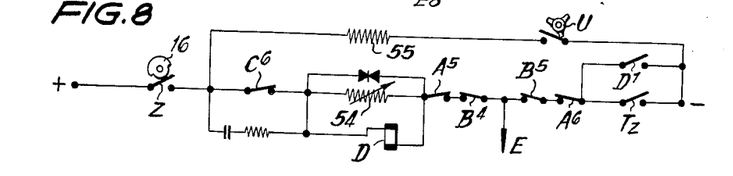
FIG. 8 is a diagram illustrating another detail of the circuit of FIG. 6.

Relay B controls three relay contacts B1, B2, B3, also shown in FIG. 7, and two relay contacts B4 and B5 shown in FIG. 8.

Relay C controls four relay contacts C1, C2, C3, and C4 shown in FIG. 7, and a relay contact C5 shown in FIG. 8.

Relay A controls the rearward turning of motor 28 and shaft 27, relay B controls the forward turning of motor 28 and shaft 27, and relay C controls the braking of motor 28 which is shown in FIG. 7 to include the stator winding N and an armature coil M. A condenser K is connected in parallel with relay C so that the same operates with a certain delay.

When contacts A3 and A4 are in the position shown in FIG. 7, the motor 28 rotates in one direction of rotation, whereas when contacts A3 and A4 are shifted out of the illustrated position, direction of rotation of motor 28 will be reversed, since the direction of the flow of current through the armature coil M is reversed. The braking of motor 28 is achieved by short-circuiting the armature coil M and by supplying the stator winding N of the motor 28 with current during the time in which relay C is not yet deenergized due to its delayed action. Cam 37 operates a switch F, and a cam H operates a switch E including three contacts, as described above with reference to FIG. 4. Consequently, switches F and E are operated in certain angular positions of shaft 27.

The operation of the apparatus will now be described: Assuming that all switches are open, with the exception of switch FH which is controlled by cam 39, all switches and contacts are in the positions shown in FIGS. 6 and 7.

The driver first closes the ignition switch G so that the circuit is energized and lamps 51, 52 and signal lamps 41, 46 and 17 will be lighted since in the initial rest position of the cam unit 39, switch FH is closed, as shown in FIG. 6. When a passenger hires the taxicab, the driver depresses pushbutton 15 having the indication F representing forward turning of shaft 27. Pushbutton 15 closes switch TV which supplies relay B with current so that relay contacts B1 to B3 are operated. Contact B1 is a holding contact supplying relay B with current after switch TV has opened again on release of pushbutton 15. The windings N and M of motor 28 are supplied with current from the battery 47 over switch G and contact B2. The motor 28 rotates in forward direction so that control cam H closes the three contacts of switch E. Relay C is energized after a delay caused by the charging of capacitor K. When relay C is energized, contacts C1 to C4 are operated, contact C2 serving as a holding contact for relay C so that the same remains energized after control cam H has released switch E. Contact C3 closes the circuit of motor windings M, N after relay B has been deenergized.

When control cam H has reached its next position during forward turning of shaft 27, it opens the three contacts E so that relay B will be cut off since contact C2 is now shifted to its other position. When relay B is deenergized, contacts B1, B2 and B3 are shifted so that the armature coil M of motor 28 is now short-circuited by switch G, and contacts C3, A3 and B2. Relay C is deenergized after a certain delay, so that stator winding N is still energized until relay C is deenergized and opens contacts C1 to C4.

After this switching operation, shaft 27 arrives in its next following position during forward turning movement, such position being associated with the fare tariff I. In this position, contact I of switch means 39a is closed by the respective control cam 39 so that signal lamp 45 associated with fare tariff I in the indicator casing 40 will be lighted together with the first signal lamp 18 in control unit 8. Both lamps indicate that tariff I is now valid and that the fare indication corresponds to this tariff. Control cam 36 on shaft 27 shifts the tariff gear transmission 21 to the gear stage corresponding to tariff I so that the flexible shaft 25 which is driven from the wheels of the car, drives the fare indicating means 13 to indicate a fare required in accordance with tariff I for the distance covered by the car. At the same time, shaft 27 has also switched on the time drive means 19 so that the fare indicating means 13 are driven from the time drive means 19 when the car is stopped, as is customary in taxicabs. In this manner, the apparatus can be set successively to operate with the tariff I, II, III and IV.

Assuming now that the taximeter has been set to tariff IV, and that it is desired to set the taximeter to tariff III. In this condition, cam 37 holds contact F closed. When the driver depresses pushbutton 15 with the indication R, control switch TR closes so that relay A is energized, and contacts A1 to A4 are switched. Holding contact A1 holds relay A energized after switch TR has opened again upon release of pushbutton 15. Contact A2 disconnects relay B from the battery 47 so that the shaft 27 cannot be turned in forward direction. At the same time, contact A2 effects flow of current in reversed direction through the armature coil M through switch G, contacts A2, A3, and A4, contact B2, and winding N. As soon as shaft 27 begins to turn in a reversed direction relay C is energized by switch E under control of cam H.

The four contacts C1 to C4 are shifted. After contact C1 is shifted, relay A is supplied with current through switch E which is connected to the negative terminal. Shifting of contact C3 permits the motor 28 to remain energized after contact A2 opens.

When control cam H reaches its next position, the three contacts E open again so that relay A will be deenergized. The armature coil M is now short-circuited through switch G, contact C3, contact A3, contact B2 and stator winding N. Since relay C deenergizes after a delay caused by the condenser K, stator coil N still receives current so that the motor 28 is braked. When relay C is deenergized, contacts C1 to C4 are shifted again.

The circuits for operating the device for indicating additional charges for "extras" is shown in FIG. 8. A first electromagnetic winding 54 is associated with the unit counter of the "extras" device and the electromagnetic winding 55 is associated with the next higher tens order. Switch U is operated by the unit counter wheel 14 to produce a carry-over pulse for energizing electromagnet 55 of the counter wheel 14 of the tens order. Relay D is a holding relay for the electromagnet 54, and has a contact D1 which is connected in parallel with switch TV in the control unit 8.

As explained above, contact Z is associated with the additional fare device and controlled by cam 16 on shaft 27. Cam 60 closes switch Z whenever shaft 27 is in any one of its operative positions, except the "For Hire" position.

Contacts A5 and A6 of relay A, shown in FIG. 7, contacts B4 and B5 of relay B, shown in FIG. 7, and contact C5 of relay C, also shown in FIG. 7, are part of the circuit shown in FIG. 8. Contact C5 of relay C is used as a pulse shaping means for electromagnet 54. A line between contacts B4 and B5 is connected to switch E shown in FIG. 7.

During the operation of the "extras" counter, switch Z must be closed. When push button 16 is operated, switch TZ is closed, so that relay D and electromagnet 54 are energized. Contact D1 holds relay D energized after release of push button 16 and opening of switch TZ. At the same time, relay C is energized after a delay through current supplied from switch E over contacts A5 and B4. However, the energization will take place after a delay due to the delayed energization of relay C. The current pulse supplied to electromagnet 54 will be proportionate to the delay energization of relay C since contact C5 opens when relay C is energized so that the electromagnet 54 is deenergized. Contacts A5, A6, B4, B5 disconnect the electromagnet 54 when a forward or reverse turning movement of shaft 27 has been initiated by operation of the respective push buttons 15F or 15R.

The switching arrangement described with reference to FIGS. 7 and 8 has a disadvantage inasmuch as it is possible to keep motor 28 continuously running and relays A and B permanently energized as long as one of the manually operated pushbuttons 15 is depressed to close switches TV or TR. Such continuous running would damage or destroy the apparatus.

Figure 9:
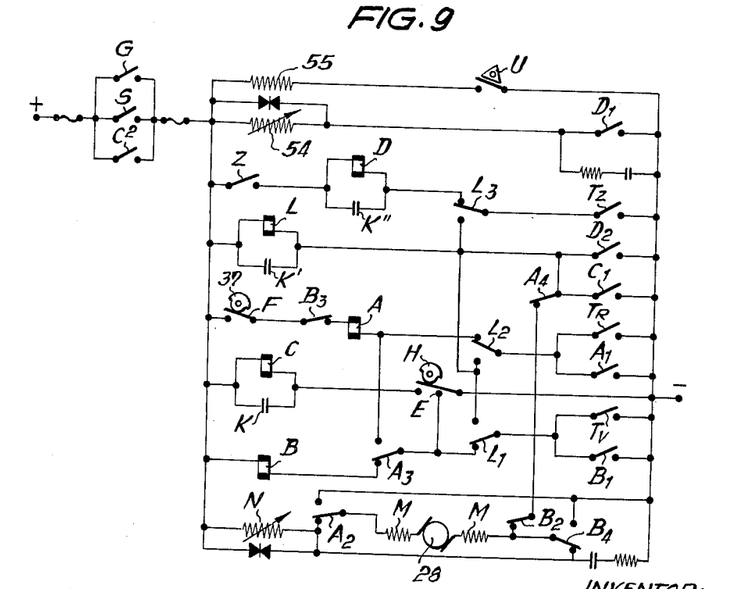
FIG. 9 is a diagram illustrating a modified circuit which serves the same purpose as the circuits shown in FIGS. 7 and 8, but has certain advantages.

This disadvantage is overcome by the modified circuit shown in FIG. 9 in which another embodiment of a switching arrangement for controlling motor 28 and the device 14 for indicating additional charges.

The circuit shown in FIG. 9 includes an additional relay L which serves for disconnecting motor 28 and relays A and B when the same are continuously energized. In the arrangement of FIG. 9 relay A for "reverse operation" has four contacts A1 to A4, relay B for "forward operation" has four contacts B1 to B4, relay C for "braking of motor 28" has two contacts C1 and C2, and additional interrupter relay L has three contacts L1 to L3. The relay D which is the pulse shaping relay for the device for indicating additional charges, has two relay contacts D1, D2.

The switching arrangement shown in FIG. 9 operates in the following manner: When the ignition switch G or switch S, is closed, a forward turning movement of shaft 27 is initiated by depressing the pushbutton 15–F which closes switch TV. Relay B is energized through switch G, relay B, contacts A3, L1 and switch TV. Contacts B1 to B4 are shifted so that motor 28 is energized through switch G, stator coil N, contact A2, armature coil M, and contact B4. Motor 28 starts to rotate so that shaft 27 turns and cam H closes contacts E and relay C is energized after a delay.

When relay C is energized, contact C1 and C2 close, and the closing of contact C1 effects energization of relay L after a delay, since relay L is connected in parallel with a capacitor K'. The energized relay L shifts relay contact L1 to L3 so that relay B is energized through switch G, relay B, contact A3, and switch E of cam H. As soon as cam H turns and opens switch E, relay B is deenergized so that contacts B1 to B4 return to the initial position thereof. The armature coil M is thus short-circuited, while stator coil N remains energized through switch G, stator coil N and contacts B4, B2, A4 and C1. When relay C is deenergized after a delay, contacts C1 and C2 also open so that stator coil N will be cut-off.

For initiating a reverse turning movement of shaft 27, cam 37 must be in a position in which switch F is closed. Pushbutton 15–R is depressed so that switch TR is closed and relay A is energized through ignition switch G, switch F, contact B3, relay A, contact L2 and switch TR. Since the four contacts A1 to A4 are shifted, motor 28 is energized through switch G, stator coil N, contact B4, armature coil M and contact A2. Due to the turning movement of motor 28 with shaft 27, cam H closes switch E so that relay C is energized and operates contact C1 to energize relay L. When relay L is energized, contact L2 is shifted so that the relay A is energized through switch G, switch F, contact B3, relay A, contact A3, and switch E. When cam H opens switch E, relay A is deenergized so that armature coil M is short-circuited, whereas stator coil N of motor 28 is still energized through switch G, stator coil N, contacts B4, B2, A4, and C1. When relay C is deenergized, contact C1 opens, and stator coil N is disconnected.

The relay L prevents a permanent energization of relays A and B because as soon as relay L is energized due to the energizing of relay C, contact L1 and L2 will be shifted so that relays A and B will be deenergized, although push button 15 may be held depressed and close control switches TV and TR. As long as relays A and B are deenergized, relay C and motor 28 will be de-energized. Only after relay C has been deenergized and motor 28 has stopped in the course of a switching operation, another depression of pushbutton 15 to close switches TV and TR will initiate a new switching operation, since until switches TV and TR are closed, contacts L1 and L2 will not have returned to the initial position shown in FIG. 9.

The switching control of the device for indicating additional charges in accordance with the modified circuit of FIG. 9 is very similar to the arrangement shown in FIG. 8. When the "extras" device is to be switched on, switch Z must be closed. The operator depresses pushbutton 16 and closes switch TZ so that relay D is energized after a delay caused by a capacitor K" connected in parallel thereto. As soon as relay D is energized contacts D1 and D2 are shifted and when contact D1 closes electromagnet 54 is energized so that the "extras" device is shifted one step. The closing of contact D2 effects energizing of relay L after a delay caused by condenser K'. Due to this delay, some time after relay D has been energized, relay L will shift contact L3, which will de-energize relay D so that contacts D1 and D2 are opened again. Electromagnet 54 will be energized only during the time during which relay L requires to be energized after the energization of relay D, but the current required for energizing electromagnet 54 will be sufficient to shift the counter mechanism for the additional charges.

It will be understood that each of the elements described above or two or more together, may also find a useful application in other types of taximeter arrangements differing from the types described above.

While the invention has been illustrated and described as embodied in a taximeter arrangement including a first unit mounted on a taxicab at a location suitable for inspection, and a second manually operated control unit mounted in the car in the region of the driver's seat, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A taximeter arrangement for a car, comprising, in combination, a first unit adapted to be mounted on the car at a location suitable for inspection and including a taximeter mechanism having fare indicating means, drive means moving at a speed depending on at least one variable and driving said fare indicating means, means for connecting said drive means to a part of the car moving at a speed proportional to the speed of the car, and electro-mechanical actuating means operatively connected to said drive means and controlling the same to perform different operations, and including switching means, said actuating means being movable in two opposite directions so that during movement of said actuating means in one direction said drive means successively perform different operations, and during movement of said actuating means in the second direction, said drive means perform said operations successively in reversed order; and a second unit including manually operated control members, and control switches operated by said control members and electrically connected to said switching means of said actuating means for controlling the same, said second unit being disposed remote from said first unit and adapted to be located in the region of the driver's seat of the car whereby the taximeter mechanism can be controlled by the driver.

2. A taximeter arrangement for a car, comprising, in combination, a first unit adapted to be mounted on the car at a location suitable for inspection and including signal lamps, switches for said signal lamps, a taximeter mechanism having fare indicating means, drive means moving at a speed depending on at least one variable and driving said fare indicating means, means for connecting said drive means to a part of the car moving at a speed proportional to the speed of the car, and electro-mechanical actuating means operatively connected to said drive means and controlling the same to perform different operations, and including switching means, said actuating means being movable in two opposite directions so that during movement of said actuating means in one direction said drive means successively perform different operations, and during movement of said actuating means in the second direction, said drive means perform said operations successively in reversed order, said actuating means controlling said switches for said signal lamps so that the same indicate the different operations of said drive means; and a second unit including manually operated control members, and control switches operated by said control members and electrically connected to said switching means of said actuating means for controlling the same, said second unit being disposed remote from said first unit and adapted to be located in the region of the driver's seat of the car whereby the taximeter mechanism can be controlled by the driver.

3. A taximeter arrangement for a car, comprising, in combination, a first unit adapted to be mounted on the car at a location suitable for inspection and including a taximeter mechanism having fare indicating means, drive means moving at a speed depending on at least one variable and driving said fare indicating means, means for connecting said drive means to a part of the car moving at a speed proportional to the speed of the car, and electro-mechanical actuating means operatively connected to said drive means and controlling the same to perform different operations, and including switching means, an electric motor controlled by said switching means, a shaft driven by said motor, and means on said shaft for controlling said drive means so that in different angular positions of said shaft, said fare indicating means are different at different speeds; and a second unit including manually operated control members, and control switches operated by said control members and electrically connected to said switching means of said actuating means for controlling the same, said second unit being disposed remote from said first unit and adapted to be located in the region of the driver's seat of the car whereby the taximeter mechanism can be controlled by the driver.

4. A taximeter arrangement for a car, comprising, in combination, a first unit adapted to be mounted on the car at a location suitable for inspection and including a taximeter mechanism having fare indicating means, drive means moving at a speed depending on at least one variable and including a transmission having a plurality of stepped speed stages for driving said fare indicating means, means for connecting said drive means to a part of the car moving at a speed proportional to the speed of the car, and electro-mechanical actuating means operatively connected to said drive means and controlling the same to perform different operations, and including switching means, an electric motor controlled by said switching means, a shaft driven by said motor, and means on said shaft for shifting said speed stages for controlling said drive means so that in different angular positions of said shaft, said fare indicating means are driven at different speeds corresponding to different tariffs; and a second unit including manually operated control members, and control switches operated by said control members and electrically connected to said switching means of said actuating means for controlling the same, said second unit being disposed remote from said first unit and adapted to be located in the region of the driver's seat of the car whereby the taximeter mechanism can be controlled by the driver.

5. A taximeter arrangement for a car, comprising, in combination, a first unit adapted to be mounted on the car at a location suitable for inspection and including a taximeter mechanism having fare indicating means, drive means moving at a speed depending on at least one variable and driving said fare indicating means, and including transmission means for driving said fare indicating means at different speeds, and electro-mechanical actuating means operatively connected to said drive means and controlling the same to perform different operations, and including switching means, an electric motor controlled by said switching means, said switching means including first relay means having first relay contacts connected to said motor for effecting turning movement of the same in a forward direction, and second relay means having second relay contacts connected to said motor for effecting turning movement of the same in the opposite direction, a shaft driven by said motor, and means on said shaft operatively connected with said transmission means for controlling said transmission means so that in different angular positions of said shaft, said fare indicating means are driven at different speeds and so that during turning of said motor and said shaft in forward directions said fare indicating means are successively driven at different speeds, while during turning of said motor and shaft said drive means is operated at said speeds in reversed order, said speeds corresponding to different tariffs; and a second unit including manually operated control members, and control switches operated by said control members and electrically connected to said switching means of said actuating means for influencing and controlling the same, said second unit being disposed remote from said first unit and adapted to be located in the region of the driver's seat of the car whereby the taximeter mechanism can be controlled by the driver.

6. An arrangement as set forth in claim 5, wherein said switching means include a delay relay operating at a delay with respect to said first and second relay means and having delayed contacts connected into the circuit of said motor effecting braking of said motor when the same arrives in one of said angular positions.

7. An arrangement as set forth in claim 6 wherein said switching means include an interrupter relay having contacts connected into the circuit of said first and second relay means for preventing continuous energization of the same by operation of said control switches in said second unit.

8. A taximeter arrangement for a car, comprising, in combination, a first unit adapted to be mounted on the car at a location suitable for inspection and including a taximeter mechanism having fare indicating means, drive means moving at a speed depending on at least one variable and including a transmission having a plurality of stepped speed stages for driving said fare indicating means, and electro-mechanical actuating means operatively connected to said drive means and controlling the same to perform different operations, and including switching means, an electric motor controlled by said switching means, said switching means including first relay means having first relay contacts connected to said motor for effecting turning movement of the same in a forward direction, and second relay means having second relay contacts connected to said motor for effecting turning movement of the same in the opposite direction, a shaft driven by said motor, and cam means on said shaft for shifting said speed stages for controlling said drive means so that in different angular positions of said shaft, said fare indicating means are driven at different speeds corresponding to different tariffs and so that during turning of said motor and said shaft in forward directions said fare indicating means are successively driven at different speeds, while during turning of said motor and shaft said drive means is operated at said speeds in reversed order, said speeds corresponding to different tariffs; and a second unit including manually operated control members, and control switches operated by said control members and electrically connected to said switching means of said actuating means for influencing and controlling the same, said second unit being disposed remote from said first unit and adapted to be located in the region of the driver's seat of the car whereby the taximeter mechanism can be controlled by the driver.

9. An arrangement as set forth in claim 8 wherein each of said speed stages of said transmission includes a coupling; and wherein said cam means include a plurality of cams for operating said couplings.

10. An arrangement as set forth in claim 8 wherein two of said control switches are respectively connected to said switching means for effecting energization of said first and second relay means, respectively.

11. A taximeter arrangement for a car, comprising, in combination, a first unit adapted to be mounted on the car at a location suitable for inspection and including a taximeter mechanism having fare indicating means, drive means moving at a speed depending on at least one variable and driving said fare indicating means, means for connecting said drive means to a part of the car moving at a speed proportional to the speed of the car, electro-mechanical actuating means operatively connected to said drive means and controlling the same to perform different operations and including switching means, said switching means including a first main switch controlled by the ignition switch of the car and a second main switch, said main switches being connected in parallel and into the circuit of said electro-mechanical actuating means so that closing of any one of said main switches effects energization of said actuating means; said actuating means being movable between a plurality of positions including a "For Hire" position, indicator means for indicating the "For Hire" position, a switch connected to said indicator means and controlled by said actuator means to close in said "For Hire" position of said actuator means, said actuator means controlling said second main switch to open the same in said "For Hire" position of said actuating means so that when the ignition switch of the car is closed, said first main switch is closed for energizing said electromagnetic actuating means and said switching means, and so that when the ignition switch is open said actuating means and switching means will be energized except when said actuating means is in said "For Hire" position and said indicator means is operative; and a second unit including manually operated control members, and control switches operated by said control members and electrically connected to said switching means of said actuating means for influencing and controlling the same, said second unit being disposed remote from said first unit and adapted to be located in the region of the driver's seat of the car whereby the taximeter mechanism can be controlled by the driver.

12. A taximeter arrangement for a car, comprising, in combination, a first unit adapted to be mounted on the car at a location suitable for inspection and including a taximeter mechanism having fare indicating means, drive means moving at a speed depending on at least one variable and driving said fare indicating means, means for connecting said drive means to a part of the car moving at a speed proportional to the speed of the car, electro-mechanical actuating means operatively connected to said drive means and controlling the same to perform different operations and including switching means, said first unit including other indicating means for additional charges, other switching means for controlling said other indicating means and operatively connected with said first-mentioned switching means; and a second unit including manually operated control members, and control switches operated by said control members and electrically connected to said switching means of said actuating means for influencing and controlling the same, said second unit being disposed remote from said first unit and adapted to be located in the region of the driver's seat of the car whereby the taximeter mechanism can be controlled by the driver and, said second unit including another manually operated member and a control switch operated by the same and connected to said other switching means to cause operation of said other indicating means.

13. A taximeter arrangement as set forth in claim 12 wherein said other switching means include electro-magnetic means, and wherein said other indicating means include indicating number wheels operatively connected to said electro-magnetic means to be shifted by the same in steps.

14. A taximeter arrangement for a taxicab and comprising, in combination, a taximeter unit adapted to be mounted on the taxicab at a location suitable for inspection and including fare indicating means, operator controlled indicator means having an inoperative position and an operative position for indicating a "For Hire" condition of the taxicab, and other indicating means for additional charges, drive means for said fare indicating means adapted to be driven from the wheels of the taxicab, and a clock work for driving said fare indicating means while the taxicab stops when said indicator means is in said inoperative position, first circuit means for controlling the operations of said fare indicating means, second circuit means for controlling the operations of said other indicating means, said first and second circuit means including actuator switches, an electric motor, an actuating cam shaft driven by said electric motor and having a plurality of cams for respectively operating said actuating switches, and switching means for controlling the operations of said motor; a control unit adapted to be located in the region of the driver's seat of the taxicab and including a plurality of push buttons respectively associated with said fare indicating means and with said other indicating means, and a plurality of control switches respectively operated by said push buttons; and a cable including a plurality of wires for respectively connecting said control switches and said switching means so that the driver of the taxicab can set said taximeter unit to different operations although the taximeter is located remote from the driver.

15. A taximeter arrangement for a taxicab and comprising, in combination, a taximeter unit adapted to be mounted on the taxicab at a location suitable for inspection and including fare indicating means, operator controlled indicator means having an inoperative position and an operative position for indicating a "For Hire" condition of the taxicab, and other indicating means for additional charges, drive means for said fare indicating means adapted to be driven from the wheels of the taxicab, said drive means including a multi-stage transmission and a flexible cable for connecting the same to the wheels, and a clock work for driving said fare indicating means while the taxicab stops when said indicator means is in said inoperative position, first circuit means for controlling the operations of said fare indicating means, second circuit means for controlling the operations of said other indicating means, said first and second circuit means including actuator switches, an electric motor, an actuating cam shaft driven by said electric motor and having a plurality of cams for respectively operating said actuating switches, other cams on said cam shaft for controlling said multi-stage transmission so that said fare indicating means is operated at different speeds corresponding to different fare tariffs, and switching means for controlling the operations of said motor; a control unit adapted to be located in the region of the driver's seat of the taxicab and including a plurality of push buttons respectively associated with said fare indicating means and with said other indicating means, and a plurality of control switches respectively operated by said push buttons; and a cable including a plurality of wires for respectively connecting said control switches and said switching means so that the driver of the taxicab can set said taximeter unit to different operations although the taximeter is located remote from the driver.

16. A taximeter arrangement for a taxicab and comprising, in combination, a taximeter unit adapted to be mounted on the taxicab at a location suitable for inspection and including fare indicating means, operator controlled indicator means having an inoperative position and and an operative position for indicating a "For Hire" condition of the taxicab, and other indicating means for additional charges, drive means for said fare indicating means adapted to be driven from the wheels of the taxicab, said drive means including a multi-stage transmission and a flexible cable for connecting the same to the wheels, and a clock work for driving said fare indicating means while the taxicab stops when said indicator means is in said inoperative position, first circuit means for controlling the operations of said fare indicating means, second circuit means for controlling the operations of said other indicating means, said first and second circuit means including actuator switches, an electric motor, an actuating cam shaft driven by said electric motor and having a plurality of cams for respectively operating said actuating switches, other cams on said cam shaft for controlling said multi-stage transmission so that said fare indicating means is operated at different speeds corresponding to different fare tariffs, and switching means for controlling the operations of said motor, said switching means including a first connecting circuit for effecting forward turning, and a second connecting circuit for effecting reverse turning of said motor; a control unit adapted to be located in the region of the driver's seat of the taxicab and including a plurality of pushbuttons respectively associated with said fare indicating means and with said other indicating means, and two pushbuttons respectively associated with forward and reverse turning of said motor, and a plurality of control switches respectively operated by said pushbuttons; and a cable including a plurality of wires for respectively connecting said control switches and said switching means and the control switches of said two pushbuttons with said first and second connecting circuits for turning said cam shaft to shift said multi-stage transmission up to higher stages or down to lower stages so that the driver of the taxicab can set said taximeter unit to different operations although the taximeter is located remote from the driver.

References Cited by the Examiner
UNITED STATES PATENTS

| | | | |
|---|---|---|---|
| 1,667,131 | 4/1928 | Sawyer | 235—30 |
| 1,675,046 | 6/1928 | Orth et al. | 235—30 |
| 1,718,341 | 6/1929 | Fausel et al. | 235—30 |
| 1,917,546 | 7/1933 | Ripoll | 235—30 |
| 2,365,435 | 12/1944 | Riegger | 235—30 |
| 2,497,784 | 2/1950 | Mehan | 235—60.31 |
| 2,596,164 | 5/1952 | Palmer | 235—30 |
| 2,709,039 | 5/1955 | McGay | 235—30 |
| 3,034,717 | 5/1962 | Werner | 235—146 |
| 3,044,700 | 7/1962 | Spingies | 235—146 |

LEO SMILOW, *Primary Examiner.*

LEYLAND M. MARTIN, *Examiner.*